United States Patent [19]

Rider

[11] 4,200,203
[45] Apr. 29, 1980

[54] CONTROL DEVICE FOR BATCH METERING SYSTEM

[75] Inventor: Jerald R. Rider, Tulsa, Okla.

[73] Assignee: Combustion Engineering, Inc., Windsor, Conn.

[21] Appl. No.: 910,322

[22] Filed: May 30, 1978

[51] Int. Cl.² .......................................... B67D 5/08
[52] U.S. Cl. .................................... 222/14; 222/20
[58] Field of Search ............................ 222/14–22, 222/23

[56] References Cited

U.S. PATENT DOCUMENTS

| | | | |
|---|---|---|---|
| 3,386,620 | 6/1968 | Smith | 222/20 |
| 3,627,175 | 12/1971 | Hisada et al. | 222/14 |
| 3,651,989 | 3/1972 | Westrich | 222/14 |
| 3,777,935 | 12/1973 | Storey | 222/16 |
| 4,105,138 | 8/1978 | Lehmann et al. | 222/14 |

Primary Examiner—Joseph J. Rolla
Attorney, Agent, or Firm—Arthur L. Wade

[57] ABSTRACT

A storage circuit receives signals representative of voltage pulse trains. A generator of voltage pulse trains feeds a predetermined number of voltage pulses into the first circuit for storage. The first circuit generates a signal to stop the generation of the first pulse train. A second train of pulses is generated by the flow of fluid to make up a batch of the fluid. The first circuit is arranged to generate a signal to a control valve for the fluid supply when the circuit has received a number of pulses in a train which equals the total required for a batch minus the predetermined number of voltage pulses manually established in storage. The circuit then establishes a second signal to the control valve when the second train of pulses equals the total number of pulses for each batch.

5 Claims, 2 Drawing Figures

CONTROL DEVICE FOR BATCH METERING SYSTEM

BACKGROUND OF THE INVENTION

Field of the Invention and Prior Art

There are many practical, down-to-earth problems in flowing a quantity of fluid into batches of the fluid. Presumably, there is the equivalence of a control valve which opens and shuts in a conduit of fluids as it flows to make up the batches. The fluid could be liquid food stuffs flowing into a cooking kettle for subsequent heat processing. The fluid could be milk flowed into shipping containers. The variety of fluids is endless. The reasons for the batches, and their sizes, are countless. One common denominator, in the way of a problem, is the closure of the valve in the fluid supply line, which has to be closed to essentially terminate the flow of fluid to the batch.

It is generally appreciated that the sudden closure of a fluid valve, particularly a liquid valve, will develop forces of great magnitude in the supply system. The hydraulic reaction from sudden valve closure can be most destructive and is desirably avoided.

The second problem is in operating the valve so that it does not overshoot the batch quantity. In effect, the valve must close with precision to give accuracy in the determination of the batch. The problem is how to develop a signal to the control valve, which will begin its closing a predetermined time prior to the completion of each batch or fluid supplied through it. The final signal can then be applied to the control valve with acceptable shock in the delivery system and repeatable accuracy in determining the quantity of the batch.

More specifically, the majority of the systems of supply are controlled by an electrical network. A flow measuring device in the supply conduit generates voltage pulses whose frequency represents the flow rate of the supplied fluid in the conduit. It is well established in the art to monitor these voltage pulses and shut the supply valve when the number of pulses in this train equals those representative of each batch. The desire, and the problem of the art, is to establish a signal for the valve, which will start its closure a predetermined number of pulses before the batch total is reached. To put it simply, an electrical system is desired, which will produce at least two control signals for fluid valves, the first signal to be generated a predetermined interval before the end of the batch to start valve closure and a second signal to precisely close the valve at the end of a batch.

Summary of the Invention

The present invention contemplates a first circuit connected to receive two trains of voltage pulses. A first manual selector of the first circuit is used to predetermine the number of pulses in the first train received from an electronic clock, or astable multivibrator. The first circuit is arranged to generate an output after it has received and stored the predetermined number of voltage pulses of the first train, and this output turns off the electronic clock. A second manual selector of the first circuit determines the amount of voltage pulses required for the total batch. A second train of voltage pulses is generated by a flow meter responsive to fluid flowing to a batch under the regulation of a control valve. The second train or voltage pulses is fed into the first circuit to generate an output signal from the first circuit to close the control valve. The concept includes generation of a first signal, which in effect comes at the end of time represented by the total number of batch pulses minus the number of pulses selected for the pre-batch. The second signal will be generated when the first circuit receives an additional number of pulses, which index the completion of the batch.

Other objects, advantages and features of the invention will become apparent to one skilled in the art upon consideration of the written specification, appended claims, and accompanying drawing.

Drawing Description

FIG. 1 is a schematic block-diagram of the complete electrical circuit, in which the present invention is embodied, and, FIG. 2 is similar to FIG. 1, but in somewhat greater detail.

Description of the Preferred Embodiment

A First Description—Broad

Figure 1:
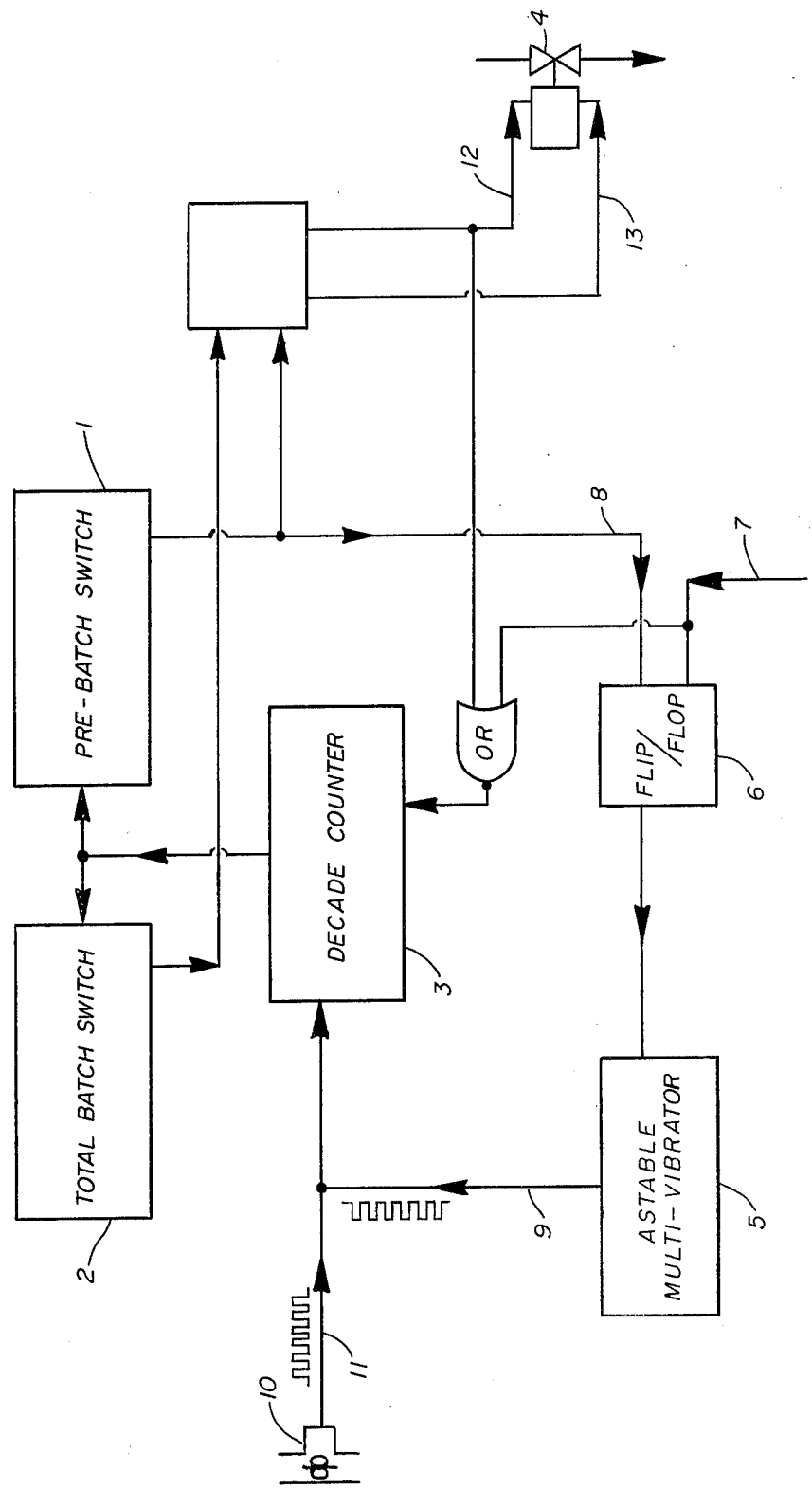

FIG. 1 of the drawing is designed to disclose the electric network (in which the invention is embodied) as a block-diagram flowsheet. Within this network, a first circuit is designated to include manual selector switch 1 and manual selector switch 2 receiving the binary coded decimal output of decade counter 3. Considering these three circuits as a unit, two trains of pulses are received and two control signals are generated for a control element, which is assumed to be in the form of a valve 4.

Switch 1 is manually set to a value which will be compared to the number of voltage pulses stored in the decade counter 3 required to establish when valve 4 will begin closing. This first train of pulses to the decade counter is generated by the electronic clock, astable multi-vibrator 5. In detail, clock 5 is controlled by flip-flop circuit 6, which receives its signal initially on line 7 and subsequent signals on line 8. The output of clock 5 is placed on line 9, which is connected to deliver the pulses to the input of the decade counter 3.

The function and connections of switch 1, clock 5, counter 3 provide for the first train of voltage pulses of clock 5 to be stored in decade counter 3. After storage of the number of pulses specified by the setting of switch 1 in decade counter 3, a signal is generated on line 8 which stops clock 5 through flip-flop 6. The second train of pulses is generated by flow meter 10, which is sensing the flow of fluid of the conduit supplying a batch of the fluid. Flow meter 10 tells us how much fluid is flowing to the batch. Control valve 4 regulates the amount of fluid flowed to each batch. Between these two elements, the electric network is responsive to flow meter 10 to control valve 4 to deliver the amount of fluid desired for each batch with precision and without hydraulic shock.

Now back to the train of voltage pulses generated by flow meter 10. Within this disclosure, this train is termed the second train or pulses and is connected to the input of the decade counter 3 of the first circuit by line 11. Therefore, the second train of pulses flows into the first circuit and is added to the stored pulses to generate the first signal for valve 4, when their total equals that specified by the setting of switch 2. The first circuit, in effect, adds the incoming second train of pulses to the stored first train of pulses, and when that sum equals the total required for a batch, the first signal is generated on line 12 to begin closing valve 4, at the same time the decade counter is reset by the signal on line 12.

The reset decade counter 3 then receives from its flow meter 10 the second train of pulses until the number of pulses received equals the setting of switch 1. At that time, the BCD output of decade counter 3 equals the BCD setting of switch 1, and a second output 13 is generated from switch 1 to close valve 4. Thus, in a very broad sense, two control signals are provided by the invention to close valve 4 in a graduated program. The objects of the invention are carried out by this precise control and reduction or hydraulic shock.

A Second Description—More Specific

Figure 2:
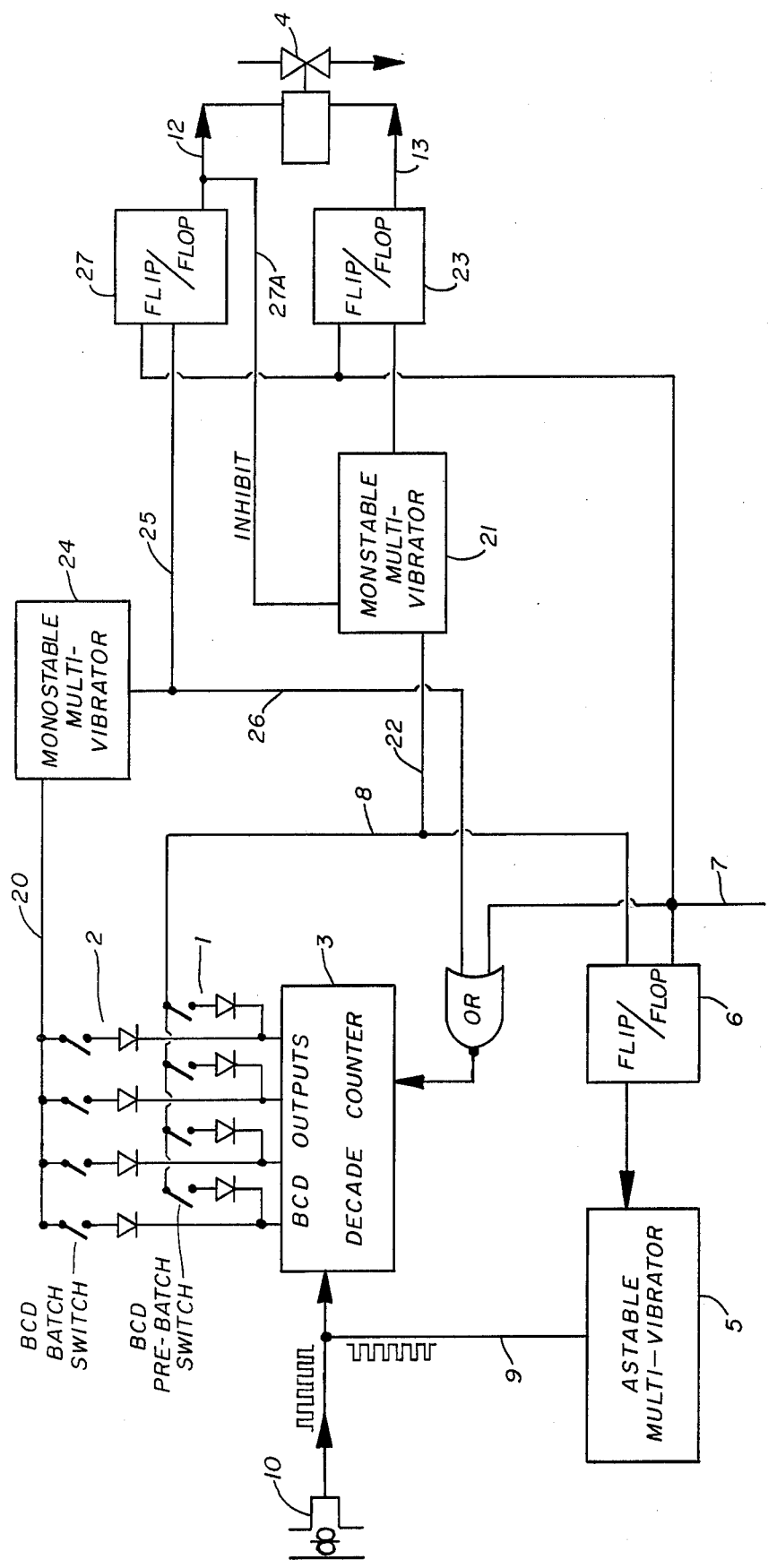

FIG. 2 discloses the circuit embodying the invention in greater detail than disclosed in FIG. 1. The first circuit is again disclosed in its three main portions. However, the decade counter 3 is connected to switchs 1 and 2, with a more specific BCD connection disclosed.

The switches 1 and 2 are now disclosed in their essential elements as connected to the BCD output of decade counter 3 to establish their output signals on lines 20 and 8.

As understood from the first broad description of FIG. 1, the pulses of the first train of generator 5 are then delivered to the decade counter to match the manually selected quantity of switch 1 and be stored on the decade counter. When this match is made, the output signal on line 8 turns off generator 5 through flip-flop 6, and also sends the same signal to monostable multi-vibrator 21 on line 22. The actuation or monostable multi-vibrator 21 is inhibited by the output of flip-flop 27, placed on line 27A.

The second train of pulses from flow meter 10 is then delivered to the input of decade counter 3. BCD output of decade counter 3 is then delivered to input of BCD switch 2.

When the number of pulses received from flow meter 10 causes the BCD output of decade counter 3 to equal the BCD setting of switch 2, an output is generated on line 20, which causes the actuation of monostable multi-vibrator 24.

The output of monostable multi-vibrator 24 establishes its output pulses on lines 25 and 26 in parallel. The signal output on line 25 is imposed upon valve 4 through flip flop 27. This signal on valve 4 is the prebatch signal which begins the closing of valve 4. The signal is specifically received by valve 4 on line 12. The signal at line 12 also removes the inhibit from monostable multi-vibrator 21, through the line 27A connection, preparing it for future actuation.

The output from monostable multi-vibrator 24, which appears on line 26 is used to reset decade counter 3.

The second train of pulses from flow meter 10 is delivered to the reset decade counter 3 until its BCD output equals the BCD setting of switch 1. Switch 1 then generates an output on line 8, which is applied to line 22 connected to the input of monostable multi-vibrator 21. The output of monostable multi-vibrator 21 causes the actuation of flip-flop 23, which produces an output on line 13 to complete the closing of valve 4.

Conclusion

Following the broad and specific descriptions of FIGS. 1 and 2, the parameters of the invention emerge clearly. The embodiment disclosed in these drawings dramatically includes the concept of establishing a quantity of signals in storage, the storage signals measuring the selected time before final actuation of a valve regulating fluid flow. The total number of control signals required to hold the valve open to determine a batch or fluid flowing through the valve is selected. This selection of the size of the batch can be changed arbitrarily while the quantity selected before its completion remains in storage. Thus, flexibility of batch size is maintained, while the predetermined quantity determined before its completion remains fixed.

Further flexibility is obtained by arbitrary selection of the number of storage signals prior to batch completion. Using the decade counter as a storage device, the flow signals through the valve are added to the storage signals to generate a first closing actuation of the valve prior to its complete closing. The decade counter is then reset and the flow signals received until the stored amount is again reached to give the final closing action on the control valve. The result is the control valve is actuated in sequence, beginning a predetermined time before it nips off the flow of fluid making up the batch. The valve element is, therefore, closed in a graduated sense, asymptotically approaching its point of complete shut off, to avoid the shock of hydraulic backlash, while gaining the position of ending the flow of fluid with desired precision.

The invention, having been described, what is claimed is:

1. An electrical network with which a control element is positioned to regulate a flow of fluid to a batch of the fluid, including,
   a first circuit adapted to receive and store eletrical voltage pulses and generate a first output control signal when a first predetermined number of the stored pulses have been received,
   a first manual selector means connected to the first circuit for manual predetermination of the number of pulses stored in the first circuit which will cause generation of the first output signal,
   a generator of voltage pulses connected to the first circuit to generate a first input of a train of voltage pulses on the connection for storage in the first circuit,
   a connection between the output of the first circuit and an input of the generator of voltage pulses through which the first output signal of the first circuit turns off the generator when the manually selected number of pulses from the first train have been stored,
   a flow meter responsive to the supply of fluid flowing to the batch and connected to the first circuit to transmit a second train of voltage pulses representative of the actual flow of fluid to the batch,
   and a control element connected to the first circuit to receive at least two output signals from the first circuit,
   wherein the first signal to the control element is generated by the first circuit when the pulses stored from the first train and the pulses of the second train equal the total number of pulses required for each fluid batch and the second signal to the control element is generated by the first circuit when subsequent flow meter pulses equal the number of pulses originally stored from the first train.

2. The electrical network of claim 1, wherein, the first circuit comprises a decade counter which receives the pulses of the first and second trains and manually resetable switches which determine the number of pulses from the first train stored in the first circuit and the total number of pulses required for each batch.

3. The electrical network of claim 1, wherein, the generator of the first train of voltage pulses is an astable multi-vibrator and the flow meter is a generator of pulses which are similar to the pulses of the multi-vibrator and the control element is a fluid valve.

4. An electrical circuit which controls a valve element regulating a flow of liquid to form batches of the liquid, including,
- a decade counter adapted to receive input voltage pulses and establish a BCD output representative of the number of pulses received,
- a first manually operated switch connected to the BCD output of the decade counter adapted to establish an output electrical signal when the BCD output of the decade counter is equal to the manually selected quantity established in the first switch,
- an astable multi-vibrator connected to deliver voltage pulses to the input of the decade counter until stopped by the output signal of the first switch,
- a second manually operated switch connected to the BCD output of the decade counter adapted to establish an output electrical signal when the BCD output of the decade counter is equal to the manually selected quantity established in the second switch,
- a flow meter connected to the decade counter and responsive to the liquid flow to the batches to deliver voltage pulses to the input of the decade counter which establishes a BCD output to the second manual switch which generates an output signal when the voltage pulses equal the quantity set on the second manual switch as representative of the total pulses of the batch,
- a valve controlling the liquid flowing into the batch and receiving the signals from the manual switches,
- and means applying the output signals of the switches so that the valve is first actuated by that signal representing the total pulses required for each batch minus the pulses stored on the decade counter from the astable multi-vibrator to begin closing the control valve and a second signal from the switches representative of the number of pulses of the astable multi-vibrator stored on the decade counter to complete the closing of the valve.

5. An electrical circuit which controls a valve element regulating a flow of liquid to form batches of the liquid, including,
- a decade counter (3) adapted to receive trains of voltage pulses,
- a first and second switch (1,2) connected to the BCD output of the decade counter with each switch enabling manual selection of the number of voltage pulses received by the decade counter and establishing separate output voltage signals when the predetermined quantity of pulses have been received by the decade counter,
- a first monostable multi-vibrator (21) connected to the first switch to receive its output and held temporarily inoperative,
- an astable multi-vibrator (5) connected by its input to the output of the first switch and in parallel with the first monostable multi-vibrator and turned off when the astable multi-vibrator has stored voltage pulses on the decade counter through connection between the output of the astable multi-vibrator and the input to the decade counter as determined by the setting of the first switch,
- a flow meter (10) responsive to the liquid flowing to the batches generating voltage pulses fed to the input of the decade counter until the stored pulses from the astable multi-vibrator and the flow meter pulses equal the number of pulses determined by the setting of the second switch which then establishes a voltage output which turns off the astable multi-vibrator,
- a second monostable multi-vibrator (24) connected to the second switch voltage output,
- a first flip-flop circuit (27) connected to the output of the second monostable multi-vibrator output to generate a first valve control signal,
- a connection (26) from the second monostable multi-vibrator output to the decade counter to reset the decade counter,
- a connection between the first flip-flop circuit and the first monostable multi-vibrator to enable the second flip-flop circuit (23) to generate a second valve control signal when subsequent flow meter pulses to the decade counter equal the quantity manually established by the first switch,
- and a control valve element (4) connected to the first flip-flop circuit to receive the first control valve signal to initiate the closing of the valve and connected to the second flip-flop circuit to receive a control signal which closes the valve.

* * * * *